United States Patent
Ye

(10) Patent No.: US 12,494,990 B2
(45) Date of Patent: Dec. 9, 2025

(54) ROUTE NOTIFYING METHODS AND ELECTRONIC DEVICES

(71) Applicant: New H3C Technologies Co., Ltd., Zhejiang (CN)

(72) Inventor: Jinrong Ye, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 42 days.

(21) Appl. No.: 18/002,835

(22) PCT Filed: Jun. 25, 2021

(86) PCT No.: PCT/CN2021/102540
§ 371 (c)(1),
(2) Date: Dec. 21, 2022

(87) PCT Pub. No.: WO2022/267056
PCT Pub. Date: Dec. 29, 2022

(65) Prior Publication Data
US 2024/0243990 A1    Jul. 18, 2024

(51) Int. Cl.
*H04L 45/16* (2022.01)
*H04L 45/74* (2022.01)

(52) U.S. Cl.
CPC ............. *H04L 45/16* (2013.01); *H04L 45/74* (2013.01)

(58) Field of Classification Search
None
See application file for complete search history.

(56) References Cited

U.S. PATENT DOCUMENTS

| | | | | |
|---|---|---|---|---|
| 11,870,681 | B2* | 1/2024 | Liu | H04L 43/026 |
| 12,335,151 | B2* | 6/2025 | Xie | H04L 45/488 |
| 2016/0127139 | A1 | 5/2016 | Tian et al. | |
| 2017/0310589 | A1* | 10/2017 | Tambakuwala | H04L 61/25 |
| 2019/0386837 | A1* | 12/2019 | Zhang | H04L 12/18 |
| 2020/0007358 | A1* | 1/2020 | Bidgoli | H04L 12/2861 |
| 2022/0224633 | A1 | 7/2022 | Xie et al. | |

FOREIGN PATENT DOCUMENTS

| | | | |
|---|---|---|---|
| CN | 106572017 A | 4/2017 | |
| CN | 108964940 A | 12/2018 | |
| CN | 109756425 A | 5/2019 | |

(Continued)

OTHER PUBLICATIONS

Xu, X. et al., "BGP Extensions for BIER draft-ietf-bier-idr-extensions-00," IETF Datatracker Website, Available Online at https://datatracker.ietf.org/doc/pdf/draft-ietf-bier-idr-extensions-00.pdf, Sep. 23, 2015, 7 pages.

(Continued)

*Primary Examiner* — Xavier S Wong
(74) *Attorney, Agent, or Firm* — McCoy Russell LLP

(57) ABSTRACT

The present disclosure provides route notifying methods and electronic devices. In an embodiment, a first ASBR in a first AS carries an NLRI as well as a newly-added BIER Path Attribute in a UPDATE message and notifies them to a second AS. BIER information in the autonomous system is (Continued)

exchanged between the ASs in a cross-AS BIER scenario, and BIER route notifying between the ASs in the cross-AS BIER scenario is realized.

18 Claims, 7 Drawing Sheets

(56) References Cited

FOREIGN PATENT DOCUMENTS

| | | |
|---|---|---|
| CN | 110784411 A | 2/2020 |
| CN | 111988228 | 11/2020 |
| CN | 112511319 A | 3/2021 |
| CN | 112737954 A | 4/2021 |
| EP | 3361682 A1 | 8/2018 |
| EP | 3783849 A1 | 2/2021 |
| EP | 3361682 | 3/2021 |
| EP | 4027597 A1 | 7/2022 |
| JP | 2018530268 A | 10/2018 |
| WO | 2016188502 A1 | 12/2016 |
| WO | 2019214589 A1 | 11/2019 |
| WO | 2021063232 A1 | 4/2021 |

OTHER PUBLICATIONS

ISA State Intellectual Property Office of the People's Republic of China, International Search Report Issued in Application No. PCT/CN2021/102540, Mar. 16, 2022, WIPO, 4 pages.

Xu, X. et al., "BGP Extensions for BIER draft-ietf-bier-idr-extensions-07," IETF Datatracker Website, Available Online at https://datatracker.ietf.org/doc/draft-ietf-bier-idr-extensions/07/, Sep. 6, 2019, 7 pages.

ISA State Intellectual Property Office of the People's Republic of China, Written Opinion of the International Searching Authority Issued in Application No. PCT/CN2021/102540, Mar. 16, 2022, WIPO, 6 pages.

European Patent Office, Extended European Search Report Issued in Application No. 21945380.0, Aug. 16, 2023, Germany, 12 pages.

Japanese Patent Office, Office Action Issued in Application No. 2022-579785, Feb. 6, 2024, 10 pages. (Submitted with Machine Translation).

State Intellectual Property Office of the People's Republic of China, Office Action and Search Report Issued in Application No. 202180001679.4, Mar. 5, 2025, 17 pages. (Submitted with Machine Translation).

* cited by examiner

ROUTE NOTIFYING METHODS AND ELECTRONIC DEVICES

CROSS REFERENCE TO RELATED APPLICATIONS

The present application is a U.S. national phase of International Application No. PCT/CN2021/102540 filed on Jun. 25, 2021, the disclosure of which is hereby incorporated by reference in its entirety for all purposes.

TECHNICAL FIELD

The present disclosure relates to the field of network communication technologies, and in particular to route notifying methods and electronic devices.

BACKGROUND

Bit Index Explicit Replication (BIER) is a new type of multi-cast technology. A router supporting BIER capability is referred to as Bit-Forwarding Router (BFR), and a domain including BFRs is called BIER domain for short. The BFRs in the BIER domain may be further divided into Bit-Forwarding Ingress Router (BFIR), Bit-Forwarding Egress Router (BFER), and intermediate BFR between the BFIR and the BFER. A multicast packet enters the BIER domain from a BFIR, then is transmitted to at least one BFER via an intermediate BFR and then leaves the BIER domain from the at least one BFER.

SUMMARY

The present disclosure provides route notifying methods and electronic devices to realize IPv6-based BIER route notifying.

As an embodiment, the present disclosure is realized by employing the following technical solutions.

Provided is a route notifying method, applied to a first autonomous system border router (ASBR) in a first autonomous system (AS), where the first ASBR is connected with a second ASBR in a second AS; the method includes:
 collecting Bit-Forwarding Router (BFR) identifiers (IDs) of respective BFRs in the first AS; and
 notifying a route UPDATE message to the second ASBR in the second AS, where the UPDATE message carries network layer reachability information (NLRI) and a Bit Index Explicit Replication (BIER) Path Attribute; the NLRI at least includes a first BFR prefix of the first ASBR in a first SD; the BIER Path Attribute at least includes the collected BFR IDs; the UPDATE message is used for a BFR in the second AS to add a corresponding Bit Index Forwarding Table (BIFT) forwarding entry in a BIFT according to the NLRI and the BIER Path Attribute; and the BIFT forwarding entry at least includes: a BFR neighbor and a forwarding bit mask (F-BM), the BFR neighbor is indicated by the first BFR prefix, the F-BM represents BFR IDs corresponding to respective BFRs reachable via the BFR neighbor, and the BFR IDs represented by the F-BM at least include the BFR IDs collected by the first ASBR in the first AS.

Provided is a route notifying method, applied to a network device in a second autonomous system (AS) and including:
 when the network device is a second border router (ASBR) and the second ASBR is connected with a first ASBR in a first AS,
 receiving a route UPDATE message notified by the first ASBR in the first AS, where the UPDATE message carries network layer reachability information (NLRI) and a Bit Index Explicit Replication (BIER) Path Attribute, the NLRI at least includes a first BFR prefix of the first ASBR in a first SD; the BIER Path Attribute at least includes BFR IDs collected by the first ASBR in the first AS; and
 notifying the NLRI and the BIER Path Attribute in the second AS, so that any BFR receiving the NLRI and the BIER Path Attribute in the second AS adds a corresponding Bit Index Forwarding Table (BIFT) forwarding entry in a local BIFT.

Provided is an electronic device, including a processor and a machine readable storage medium; where,
 the machine readable storage medium stores machine executable instructions executable by the processor;
 the processor is configured to execute the machine executable instructions to implement the steps of any one of the above methods.

In the above technical solutions of the present disclosure, the first ASBR in the first AS carries the NLRI as well as the newly-added BIER Path Attribute in the UPDATE message and notifies them to the second AS. The BIER information in the autonomous system is exchanged between the ASs in the cross-AS BIER scenario, and BIER route notifying between the ASs in the cross-AS BIER scenario is realized.

DETAILED DESCRIPTION OF THE EMBODIMENTS

Figure 1:
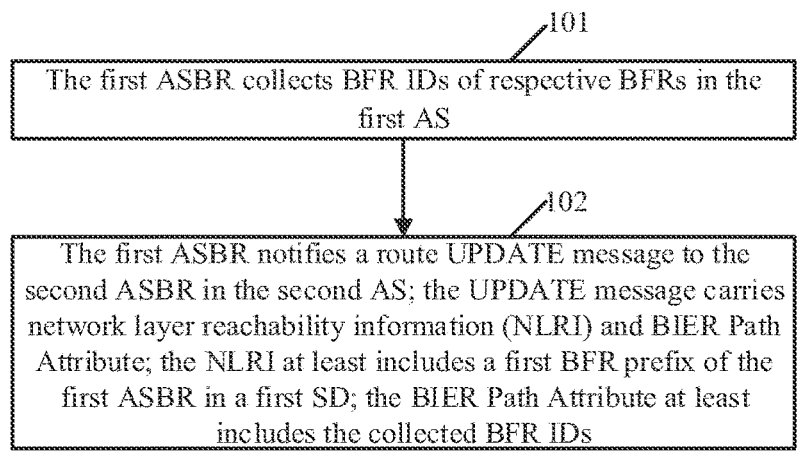
FIG. 1 is a flowchart of a method according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The implementations described in the following exemplary embodiments do not represent all implementations consistent with the present disclosure. Rather, they are merely examples of apparatuses and methods consistent with some aspects of the present disclosure as detailed in the appended claims.

The terms used in the present disclosure are used only for the purpose of describing the specific embodiments rather than limiting the present disclosure. "A", "the" and "said" in the singular form used in the present disclosure and the appended claims are also intended to include plural unless otherwise clearly indicated in the context.

In order to help those skilled in the art to understand the technical solutions of the embodiments of the present disclosure better and make the above objects, characteristics and advantages of the embodiments of the present disclosure clearer, technical terms relating to the embodiments of the present disclosure are described below.

Sub-domain (SD), which refers to a BIER sub-domain. One BIER domain includes at least one BIER sub-domain. In the BIER domain, for each BIER sub-domain, a BFR identifier (ID) is configured for a specified BFR in the BIER sub-domain. Here, the specified BFR may be BFIR, BFER and the like, which is not limited herein.

BFR-Prefix, which represents a BFR, different BFRs in a same SD being represented by different BFR prefixes. In a specific implementation, the BFR prefix indicating a BFR may be denoted as one IPv4 address or IPv6 address of the BFR. In this embodiment, the IPV6 address is taken as an example of the BFR prefix.

BIER encapsulation type, which represents a BIER encapsulation type supported by the BFR, for example, an MPLS type, an Ethernet type, an IPV6 type (denoted as BIER6) and the like.

Bit String Length (BSL), which represents a length of a bit string in a BIER encapsulation.

MAX Set Identifier (SI), which represents a maximum number of SIs. SI represents an ID of a set to which a bit string in the BIER encapsulation belongs. When a range of the BFR ID exceeds a range that the BSL can represent, a plurality of sets are required for representation, where each set has one unique ID. For example, when the range of the BFR ID is 1-512 and the BSL is 256, two sets are required for representation. SI=0 represents 1-256 and SI=1 represents 257-512.

Based on the description of the technical terms above, a method according to an embodiment of the present disclosure is described below.

FIG. 1 is a flowchart of a method according to an embodiment of the present disclosure. The method is applied to an across-Autonomous System (AS) BIER scenario. Each AS in the across-AS BIER scenario deploys a BIER (an AS on which a BIER is deployed is denoted as an AS BIER). As an embodiment, the method may be applied to a first AS Autonomous System Border Router (ASBR) in a first AS in the cross-AS BIER scenario. In this embodiment, the first ASBR is connected with a second ASBR in a second AS. It is noted that the first AS, the first ASBR, the second AS and the second ASBR are named for case of descriptions rather than for limitation.

As shown in FIG. 1, the flow may include the following steps.

At step 101, the first ASBR collects BFR IDs of respective BFRs in the first AS.

As an embodiment, the BFR IDs of respective BFRs in the first AS collected by the first ASBR may include a BFR ID of a BFR deployed as a BFIR in the first AS and a BFR ID of a BFR deployed as a BFER in the first AS.

Optionally, an Interior Gateway Protocol (IGP) module or a BIER route management module running on the first ASBR may collect BFR IDs of respective BFRs in the present AS based on the IGP. When the step 101 is performed, the first ASBR may collect the BFR IDs of respective BFRs in the first AS from the IGP module or the BIER route management module, for example, the BFR ID of the BFR deployed as the BFIR in the first AS and the BFR ID of the BFR deployed as the BFER in the first AS.

At step 102, the first ASBR notifies a route UPDATE message to the second ASBR in the second AS; the UPDATE message carries network layer reachability information (NLRI) and BIER Path Attribute; the NLRI at least includes a first BFR prefix of the first ASBR in a first SD; the BIER Path Attribute at least includes the collected BFR IDs.

Figure 2:
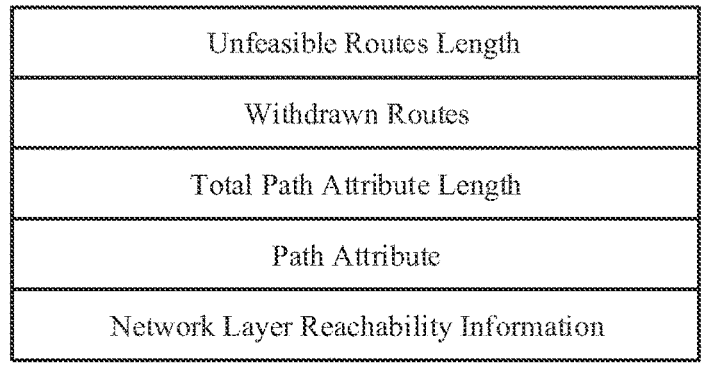
FIG. 2 is a schematic diagram of a format of an EBGP UPDATE message according to an embodiment of the present disclosure.

As mentioned in the step 102, the first ASBR notifies network reachability information corresponding to a first BFR prefix of the first ASBR in the first SD through the UPDATE message. Optionally, the UPDATE message in the embodiment may be obtained by making an extension to an External Border Gateway Protocol (EBGP), specifically, newly obtaining an EBGP UPDATE message of a Path Attribute by an extension. The newly-obtained Path Attribute here is the BIER Path Attribute. In this embodiment, the BIER Path Attribute may be taken as a Path Attribute newly added in the EBGP UPDATE message, and the specific position of the Path Attribute newly added in the EBGP UPDATE message is not limited herein. FIG. 2 exemplifies an existing format of an EBGP UPDATE message, and the BIER Path Attribute in the embodiment may be a Path Attribute newly added to the Path Attributes shown in FIG. 2. In this embodiment, the BIER Path Attribute may be in the format of TLV (Type-Length-Value), which will be described by way of examples below. It should be noted that the first SD is only named for case of descriptions, and generally refers to any SD in which the first ASBR is currently located. The first BFR prefix uniquely indicates the first ASBR, which may be an IPV6 address or an IPV4 address, which is not specifically limited in this embodiment.

As mentioned in the step 102, the UPDATE message carries Network Layer Reachability Information (NLRI) as well as the newly-added BIER Path Attribute. As an embodiment, the NLRI at least includes the first BFR prefix and a length of the first BFR prefix. For example, the NLRI includes 2001:2:3F::1/128.

As mentioned in the step 102, the first ASBR notifies the UPDATE message to the second ASBR in the second AS, and after the second ASBR receives the UPDATE message, it will continue to notify the NLRI and the BIER Path Attribute carried in the UPDATE message in the second AS such that all the BFRs in the second AS may receive the NLRI and the BIER Path Attribute notified by the second ASBR. When receiving the NLRI and the BIER Path Attribute notified by the second ASBR, a BFR in the second AS adds a corresponding BIFT forwarding entry in a local BIFT. That is to say, finally through the UPDATE message, the BFR in the second AS may add a corresponding Bit Index Forwarding Table (BIFT) forwarding entry in a BIFT according to the NLRI and the BIER Path Attribute carried in the UPDATE message.

In an example, if the second ASBR supports BIER, the second ASBR may also add the corresponding BIFT forwarding entry in the local BIFT. On the contrary, if the second ASBR does not support the BIER, for example, it supports the BIER in a control plane (for which a software upgrade is easier), but does not support the BIER in a forwarding plane (for example, hardware does not have the ability to support the BIER), the second ASBR may not add the corresponding BIFT forwarding entry in the local BIFT.

In an example, the BIFT forwarding entry at least includes: a BFR neighbor (BFR-NBR) and a forwarding bit mask (F-BM), where the BFR neighbor is indicated by the first BFR prefix, the F-BM at least represents BFR IDs corresponding to respective BFRs reachable via the BFR neighbor, and the BFR IDs represented by the F-BM at least include the BFR IDs collected by the first ASBR in the first AS.

Optionally, in this embodiment, the BFR ID may be represented by a bit mask of an SI combination corresponding to the BFR ID. For example, in the F-BM, bits corresponding to the BFR IDs corresponding to respective BFRs reachable via the BFR neighbor are set to a first value, for example, 1, and the remaining bits are set to a second value, for example, 0. In the F-BM, that a bit is set to the first value (for example, 1), indicates that the BFR corresponding to the BFR ID represented by the bit can be reached via the BFR neighbor. When the bit is set to 0, it indicates that the BFR corresponding to the BFR ID represented by the bit cannot be reached via the BFR neighbor. Detailed descriptions for the above will be made below.

It can be seen from the flow shown in FIG. 1 that, in this embodiment, the BIER information in the autonomous system is exchanged between the ASs in the cross-AS BIER scenario, and BIER route notifying between the ASs in the cross-AS BIER scenario is realized.

Further, based on the description of the UPDATE message, in this embodiment, a BIER Path Attribute is newly added in the EBGP UPDATE message defined by the EBGP by making an extension to the EBGP, so as to realize exchange of the BIER information in the autonomous system between the ASs in the cross-AS BIER scenario with the existing EBGP, thus expanding application scope.

The BIER Path Attribute is described below.

Figure 3:
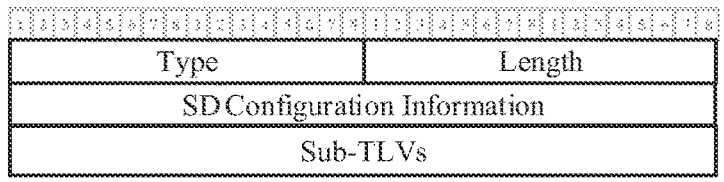
FIG. 3 is a schematic structural diagram of a BIER Path Attribute according to an embodiment of the present disclosure.

As mentioned above, the BIER Path Attribute may be one TLV structure. FIG. 3 exemplifies a structure of a BIER Path Attribute. A Type field and a Length field in the BIER Path Attribute can be set according to actual requirements. Preferably, Sub-TLVs fields in the structure of the BIER Path Attribute shown in FIG. 3 carry the following two newly-added sub-sub-TVLs which are denoted as a first TLV and a second TLV respectively.

1) the First TLV

Figure 4:
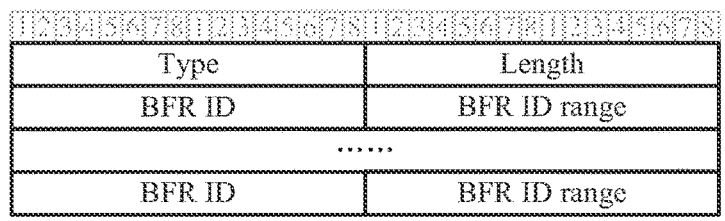
FIG. 4 is a schematic structural diagram of a first TLV according to an embodiment of the present disclosure.

In this embodiment, the first TLV is used to carry the BFR IDs collected by the first ASBR in the first AS. Optionally, as shown in FIG. 4, the first TLV at least includes at least one field pair. Each field pair includes a BFR ID field and a BFR ID range field which are in corresponding relationship. In this embodiment, the first TLV carries the BFR IDs collected by the first ASBR in the first AS through at least one field pair.

In each field pair, a parameter carried in the BFR ID Range field represents a BFR ID segment with continuous values, and the BFR ID field carries a start BFR ID of the BFR ID segment. It is noted that when the first TLV includes two or more field pairs, the start BFR IDs carried in different BFR ID fields in different field pairs are different. For example, the BFR IDs collected by the first ASBR in the first AS are divided into two parts: one part is 1-251 and the other part is 260-512. In this case, the first TLV may include two field pairs, where one field pair includes BFR ID field 1_1 and BFR ID Range field 1_1; the other field pair includes BFR ID field 1_2 and BFR ID Range field 1_2. The BFR ID field 1_1 carries the start value 1 of the BFR ID segment with continuous values, i.e. 1-251, and the BFR ID Range field 1_1 carries 251 to represent the BFR ID segment with continuous values, i.e. 1-251, which may represent that there are 251 BFR IDs in the BFR ID segment with continuous values, i.e. 1-251). The BFR ID field 1_2 carries the start value 260 of the BFR ID segment with continuous values, i.e. 260-512, and the BFR ID Range field 1_2 carries 253 to represent the BFR ID segment with continuous values, i.e. 260-512, which may represent that there are 253 BFR IDs in the BFR ID segment with continuous values, i.e. 260-512.

Optionally, as shown in FIG. 4, in this embodiment, the first TLV further includes a Type field and a Length field. The Type field and the Length field may be set according to actual situations, for example, the length of the Type field is set to 2 bytes, and the length of the Length field is set to 2 bytes and the like, which is not limited herein in this embodiment.

2) the Second TLV

Figure 5:
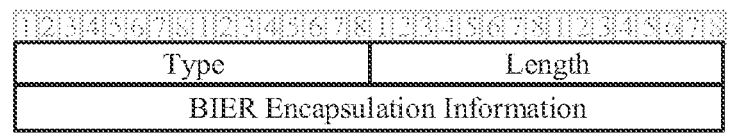
FIG. 5 is a schematic structural diagram of a second TLV according to an embodiment of the present disclosure.

In this embodiment, the second TLV indicates BIER encapsulation information supported by the first ASBR. Optionally, as shown in FIG. 5, the second TLV may at least include: a Type field, a Length field, and a BIER encapsulation information field. The Type field is used to carry a BIER encapsulation type supported by the first ASBR, for example, an MPLS encapsulation type, an IPV6-based BIER (denoted as BIER6) and the like. Optionally, the length of the Type field may be set to 2 bytes. The Length field may be set according to actual situations. The Length field represents the length of the BIER encapsulation information field, for example, two bytes. The BIER encapsulation information field is used to carry the BIER encapsulation information supported by the first ASBR. As an embodiment, the BIER encapsulation information may be used to assist the second ASBR in determining an entry identifier of the BIFT forwarding entry. In an example, the BIER encapsulation information may at least include MAX SI, BSL and BIFT ID.

The MAX SI represents an SI corresponding to a maximum BFR ID in the first AS where the first ASBR is located. Optionally, the MAX SI may occupy 8 bits.

The BSL represents a bit string length in a BIER encapsulation supported by the first ASBR. Optionally, the BSL may occupy 4 bits.

The BIFT ID represents an identifier of a local BIFT. A triad of BSL, SD, and SI corresponds to an unique BIFT identifier of the local BIFT.

Optionally, as an embodiment, the BIER Path Attribute further carries an SD configuration field shown in FIG. 3. The SD configuration field carries SD configuration information. AS an embodiment, the SD configuration information at least includes the first SD and the BFR ID of the first ASBR. To facilitate subsequent expansion, the BIER Path Attribute can further include a Reserved field, which will not be repeated herein.

The BIER Path Attribute is exemplified above.

The flow shown in FIG. 1 is described from the perspective of the first ASBR of the first AS. The method flow according to an embodiments of the present disclosure is described below from the perspective of the second ASBR in the second AS.

Figure 6:
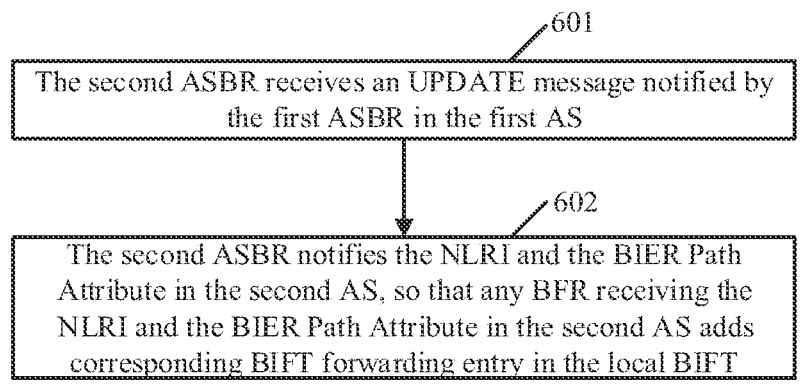
FIG. 6 is flowchart of a second method according to an embodiment of the present disclosure.

FIG. 6 is a flowchart of a second method according to an embodiment of the present disclosure. The method is applied to the second ASBR in the second AS. The second ASBR is connected with the first ASBR in the first AS.

As shown in FIG. 6, the flow may include the following steps.

At step 601, the second ASBR receives an UPDATE message notified by the first ASBR in the first AS.

As described above, the UPDATE message here at least carries NLRI and a newly-added BIER Path Attribute; the NLRI at least includes a first BFR prefix of the first ASBR in the first SD; the BIER Path Attribute at least includes BFR IDs collected by the first ASBR in the first AS. The BFR IDs collected by the first ASBR in the first AS are as described above, and will not be repeated herein.

At step 602, the second ASBR notifies the NLRI and the BIER Path Attribute in the second AS, so that a BFR receiving the NLRI and the BIER Path Attribute in the second AS adds corresponding BIFT forwarding entry in the local BIFT.

Figure 7:
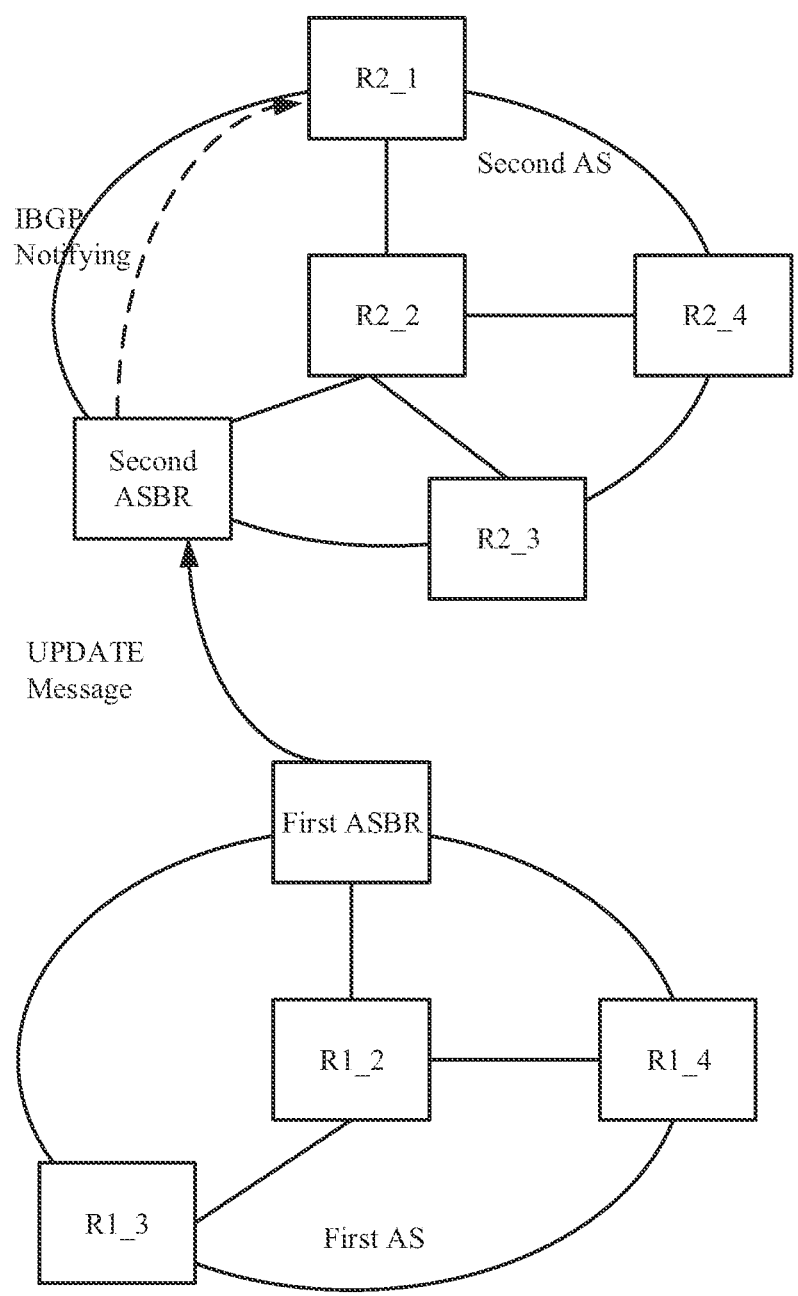
FIG. 7 is a schematic diagram of a network notifying a route based on an EBGP according to an embodiment of the present disclosure.

Optionally, as an embodiment, the second ASBR may notify the NLRI and the BIER Path Attribute in the second AS by making an extension to the IBGP protocol. In a specific implementation, the IBGP UPDATE message carries the NLRI and the BIER Path Attribute, and notifies the NLRI and the BIER Path Attribute to a designated BFR (a peer of the second ASBR) by making an extension to the IBGP UPDATE message defined by the IBGP, so that the designated BFR in the second AS adds the corresponding BIFT forwarding entry in the local BIFT. FIG. 7 exemplifies a network of IBGP notifying. The BIFT forwarding entry will be described below and will not be repeated herein.

It should be noted that, as described above, if the second ASBR supports BIER in the control plane (where software upgrade is easier) but does not support the BIER in the forwarding plane (for example, hardware does not have the ability to support BIER), the second ASBR may not add the corresponding BIFT forwarding entry in the local BIFT.

Thus, the flow shown in FIG. 6 is completed.

It can be seen from the flow shown in FIG. 6 that in this embodiment, the second ASBR in the second AS notifies prefix route reachability information in the external first AS in the second AS and carries the BIER Path Attribute. In this way, the BIER information in the autonomous system is exchanged between the ASs in the cross-AS BIER scenario, and BIER route notifying between the ASs in the cross-AS BIER scenario is realized.

Figure 8:
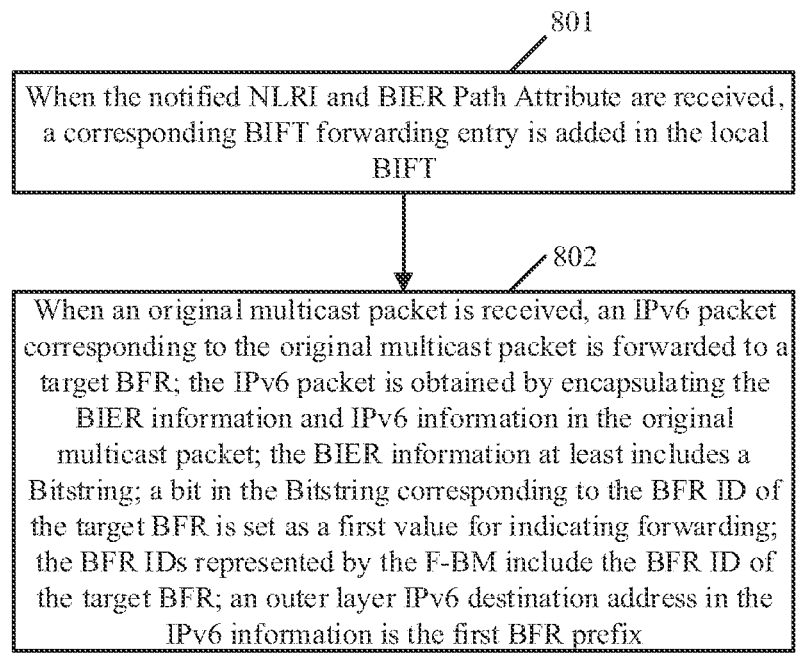
FIG. 8 is flowchart of a third method according to an embodiment of the present disclosure.

The method flow according to an embodiment of the present disclosure is described below from the perspective of any BFR in the second AS other than the second ASBR:

FIG. 8 is a flowchart of a third method according to an embodiment of the disclosure. The flow is applied to any BFR in the second AS other than the second ASBR. As shown in FIG. 8, the flow may include the following steps.

At step 801, when the notified NLRI and BIER Path Attribute are received, a corresponding BIFT forwarding entry is added in the local BIFT.

As an embodiment, the BIFT forwarding entry here at least includes: a Forwarding BitMask (F-BM) and a BFR neighbor (BFR-NBR). The BFR neighbor is indicated by a first BFR prefix, such as the IPV6 address of the first BFR, and the F-BM at least represents BFR IDs corresponding to respective BFRs reachable via the BFR neighbor.

Optionally, the BFR IDs represented by the F-BM here at least includes the respective BFR IDs collected by the first ASBR in the first AS. Optionally, in this embodiment, the F-BM can represent a BFR ID through a bit mask of a combination of the BFR neighbor and a SI corresponding to the BFR ID. In the F-BM, a bit corresponding to the BFR ID is set to a first value such as 1, to indicate that the BFR corresponding to the BFR ID indicated by the bit can be reached through the BFR neighbor. In the F-BM, for a BFR ID corresponding to each BFR that cannot be reached through the BFR neighbor, the bit corresponding to the BFR ID is set to a second value, such as 0, to indicate that the BFR corresponding to the BFR ID indicated by the bit cannot be reached through the BFR neighbor. The BIFT forwarding entry will be described below and will not be repeated herein.

It should be noted that any BFR other than the second ASBR in the second AS may also notify an NLRI and a BIER Path Attribute in a manner similar to that the second ASBR notifies an NLRI and a BIER Path Attribute.

At step 802, when an original multicast packet is received, an IPV6 packet corresponding to the original multicast packet is forwarded to a target BFR; the IPV6 packet is obtained by encapsulating the BIER information and IPV6 information in the original multicast packet. The BIER information at least includes a Bitstring. A bit in the Bitstring corresponding to the BFR ID of the target BFR is set as a first value for indicating forwarding. The BFR IDs represented by the F-BM include the BFR ID of the target BFR. An outer layer IPv6 destination address in the IPV6 information is the first BFR prefix.

In an example, when any BFR receives the original multicast packet, it may query a multicast forwarding table to obtain the Bitstring corresponding to the BFER of the original multicast packet, and then encapsulate the BIER information (at least including the Bitstring) and the IPV6 information in the original multicast packet.

Based on the description of the step 802, when receiving the IPV6 packet, a network device that does not support BIER in the second AS IPv6 unicast forwards the IPV6 packet according to a match between a destination IP address of the IPV6 packet (that is, the first BFR prefix mentioned above) with a normal IPv6 forwarding entry, and. For example, when receiving an IPV6 packet, the second ASBR unicast forwards the IPV6 packet according to the outer layer IPv6 destination address in the IPv6 packet.

As can be seen from the above description, in this embodiment, only a device connected to a multicast source in the second AS is to support BIER, and the fact that other network devices in the second AS do not support BIER may not affect multicast packet forwarding, which facilitates smooth upgrade of the network.

Thus, the flow shown in FIG. 8 is completed.

It can be seen from the flow shown in FIG. 8 that in this embodiment, any BFR other than the second ASBR in the second AS learns prefix route reachability information in the first AS notified by the second ASBR (carrying the BIER Path Attribute), thus the packet forwarding between ASs in the cross-AS BIER scenario can be realized.

A specific embodiment is described below in combination with the above processes.

Figure 9:
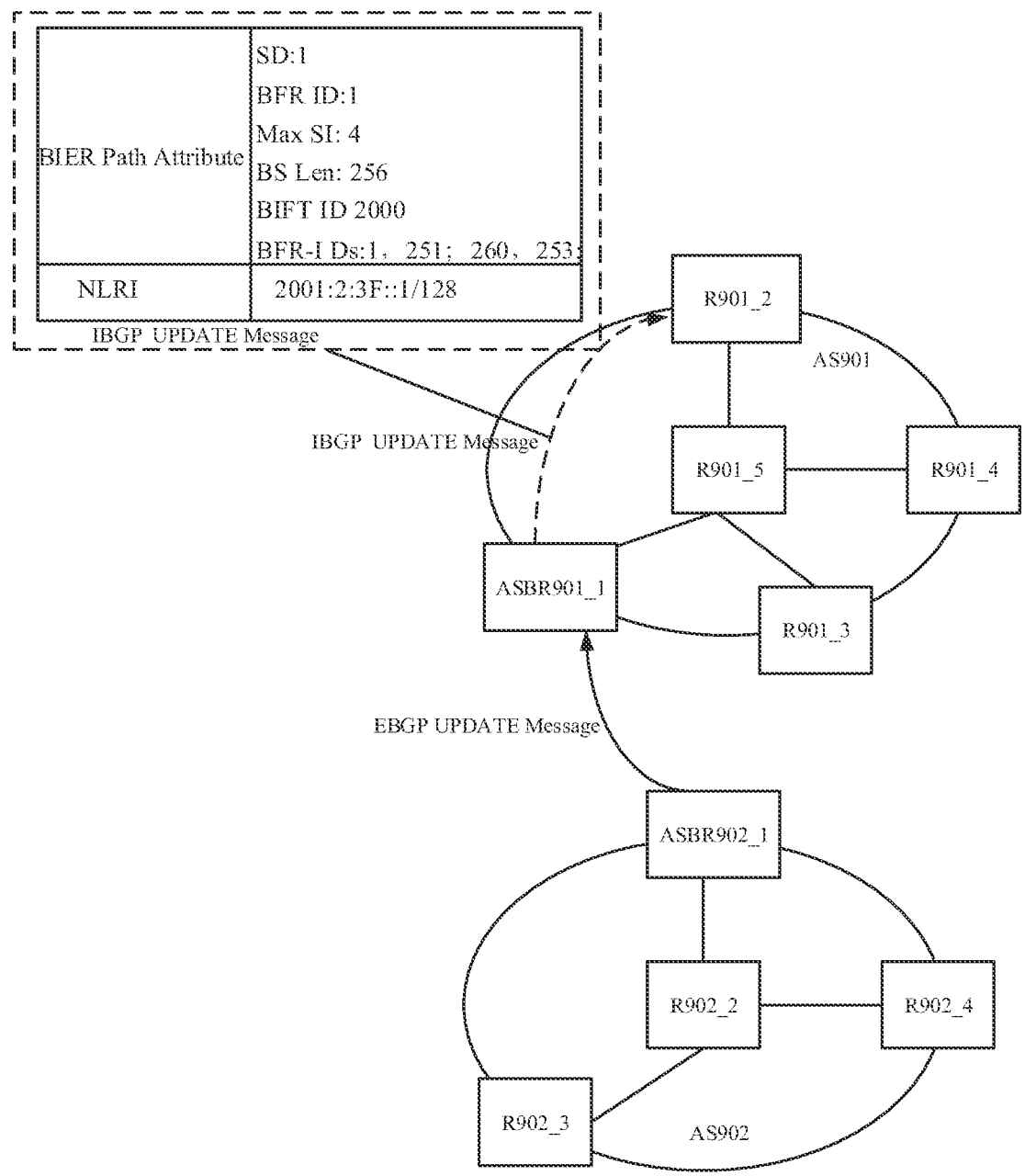
FIG. 9 is a schematic diagram of an application network according to an embodiment of the present disclosure.

FIG. 9 is a schematic diagram of an application network according to an embodiment of the present disclosure. In the embodiment shown in FIG. 9, ASBR902_1 in AS902 notifying a BIER route of AS902 to AS901 is taken as an example, then:

In FIG. 9, a configuration of ASBR902_1 is shown in Table 1.

TABLE 1

| SD | BFR-ID | MAX SI | BSL | BIFT ID | BFR-Prefix |
|----|--------|--------|-----|---------|------------|
| 1  | 1      | 4      | 256 | 2000    | 2001:2:3F::1 |

As shown in FIG. 9, ASBR902_1 can collect BFR IDs of respective BFRs in AS902 from the IGP module or the BIER route management module. As an embodiment, the BFR IDs collected by ASBR902_1 are exemplified as 1 to 251, 260 to 512.

Based on the BIER Path Attribute as described above, as an embodiment, ASBR902_1 can notify unicast prefix route reachability information corresponding to a BFR-Prefix of ASBR902_1 to AS901_1 through an EBGP UPDATE message. The following Table 2 exemplifies the BIER Path Attribute and the NLRI carried in the EBGP UPDATE message:

TABLE 2

| BIER Path Attribute | SD: 1, BFR ID: 1<br>Max SI: 4<br>BS Len: 256<br>BIFT ID 2000<br>BFR-IDs: 1, 251; 260, 253 (Note: indicating two consecutive BFR ID segments, one of which has a starting value of 1, the number of BFR IDs contained is 251, and the other of which has a starting value of 260, and the number of BFR IDs contained is 253) |
|---|---|
| NLRI | 2001:2:3F::1/128 |

ASBR902_1 notifies the EBGP UPDATE message to AS901. The EBGP UPDATE message carries at least the BIER Path Attribute and the NLRI shown in Table 2.

ASBR901_1 in AS901 receives the EBGP UPDATE message. The EBGP UPDATE message carries the BIER Path Attribute and the NLRI as shown in Table 2.

ASBR901_1 notify the BIER Path Attribute and the NLRI as shown in Table 2 carried in the EBGP UPDATE message to a designated BFR in AS901 (R901_2 is taken as an example) through the IBGP UPDATE message. Reference may be made to the embodiment shown in FIG. 7 for detail.

R901_2 receives the IBGP UPDATE message and adds a corresponding BIFT forwarding entry in a local BIFT. As an embodiment, taking R901_2 as an example, R901_2 adds the corresponding BIFT forwarding entry in the local BIFT as follows:

Adding the BIFT forwarding entry to a BIFT with a BIFT ID of 2000; and adding the BIFT forwarding entry to a BIFT with a BIFT ID of 2001.

Here, when the BSL, SD, and SI in the BIER Path Attribute are 3, 1, and 0, respectively, it is determined that the corresponding BIFT ID is 2000. When the BSL, SD, and SI in the BIER Path Attribute are 3, 1, and 1, respectively, it is determined that the corresponding BIFT ID is 2001.

Table 3 exemplifies adding the corresponding BIFT forwarding entry in the local BIFT:

TABLE 3

| BIFT-id(BSL/SD/SI) | F-BM | BFR-NBR |
|---|---|---|
| 2000(3/1/0) | 0000011111 . . . 111111<br>(a number of 1 is 251) | 2001:2:3F::1 |
| 2001(3/1/1) | 11111111 . . . 1111000<br>(a number of 1 is 251) | 2001:2:3F::1 |

In Table 3, a corresponding bit of F-BM is set to 1, which indicates that the BFR corresponding to the BFR ID indicated by the bit can be reached through the BFR-NBR in the Table 3. On the contrary, when the corresponding bit of the F-BM is set to 0, which indicates that the BFR corresponding to the BFR ID indicated by the bit cannot be reached through the BFR-NBR in the Table 3. The F-BM shown in the second row of the Table 3: "0000011111 . . . 111111 (a number of 1 is 251)" is taken as an example, the first "1" counting from the right indicates that the BFR ID is 0, and the second "1" counting from the right indicates that the BFR ID is 1, and so on.

It should be noted that in this embodiment, not all devices in AS901 are to support the BIER. In order to implement multicast packet forwarding, as an embodiment, in this embodiment, only devices connected to a multicast source in AS901, such as R901_2, are to support the BIER, while devices not connected to the multicast source in AS901, such as R901_3, etc. do not support the BIER.

Based on the BIFT forwarding entry, a packet forwarding process is described below:

Still taking R901_2 as an example, R901_2 receives an original multicast packet to be forwarded to all or part of the BFERs in AS902 (for case of descriptions, forwarding to all BFERs in AS902 is taken as an example here). For case of descriptions, the original multicast packet is recorded as packet a1 here.

Figure 10:
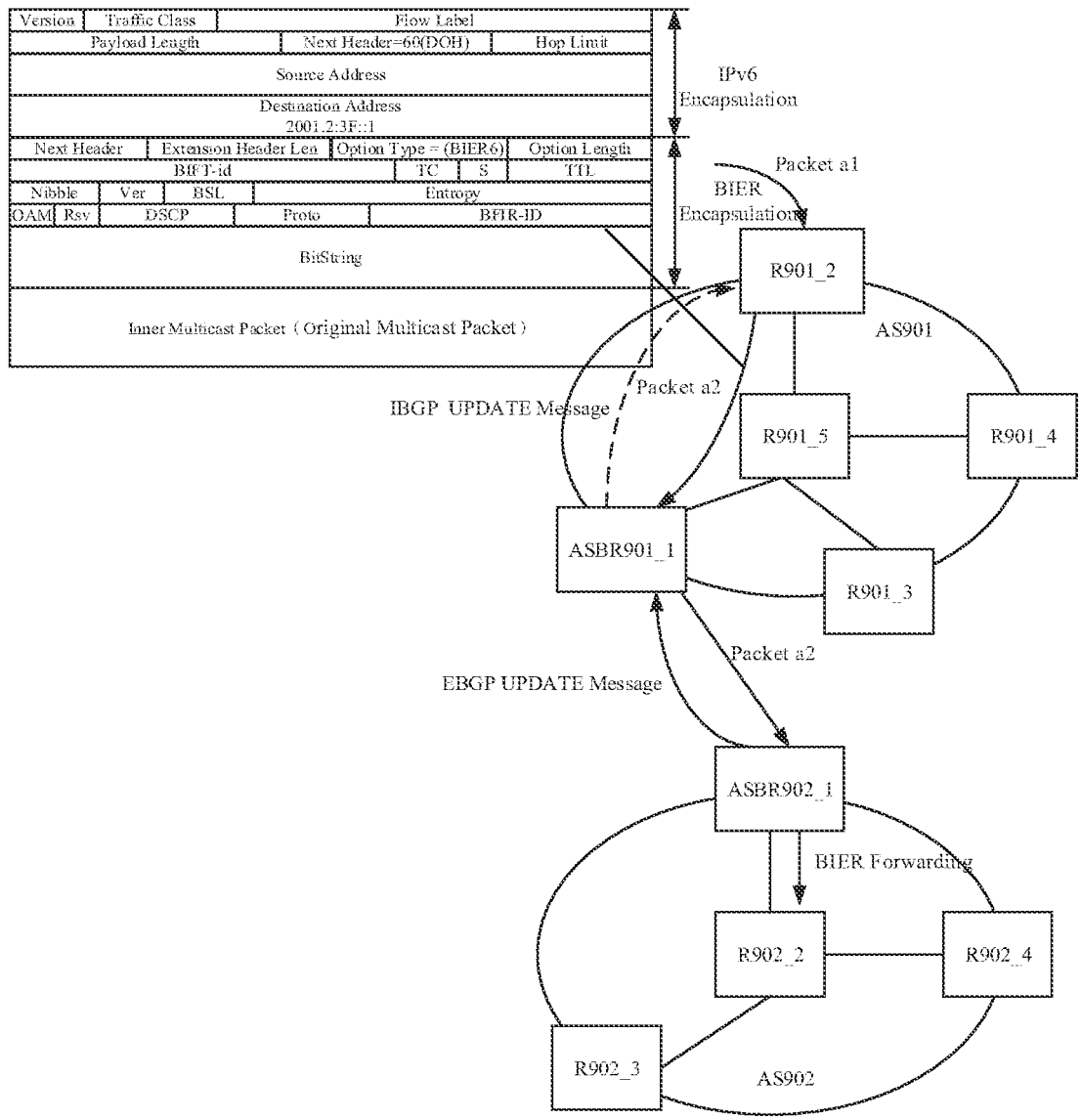
FIG. 10 is a schematic diagram of packet forwarding according to an embodiment of the present disclosure

R901_2 encapsulates BIER information (denoted as a BIER encapsulation header) in the packet a1, and a bit in the BitString in the BIER information corresponding to BFR ID of each BFER in the AS902 is 1, and IPv6 information (denoted as IPv6 header) is encapsulated in an outer layer of the packet a1. An outer IPV6 destination address in the IPV6 information is set to a BFR-NBR address in the above-mentioned BIFT forwarding entry (that is, the BFR-Prefix address 2001:2:3F::1 of ASBR902_1). For case of descriptions, the packet a1 with the BIER information and the IPV6 information encapsulated may be recorded as packet a2. The structure of the packet a2 is as shown in FIG. 10.

R901_2 forwards the packet a2 in AS901.

ASBR901_1 receives the packet a2, and IPv6 unicast forwards the packet a2 according to a match between the outer IPv6 destination address of the packet a2 and the normal IPv6 forwarding entry.

ASBR902_1 receives the packet a2, and if the outer IPv6 destination address of the packet a2 is the BFR-Prefix address of the device, the packet a2 is BIER forwarded. The BIER forwarding here means forwarding according to the existing BIER forwarding rules. Finally, the forwarding of multicast packets is realized.

It can be seen from the above description that this embodiment may require the device connected to the multicast source in AS901, such as the R901_2, to support the BIER, while the device not connected to the multicast source in AS901, such as the R901_3, does not support BIER.

Thus, descriptions of the embodiments are completed.

Figure 11:
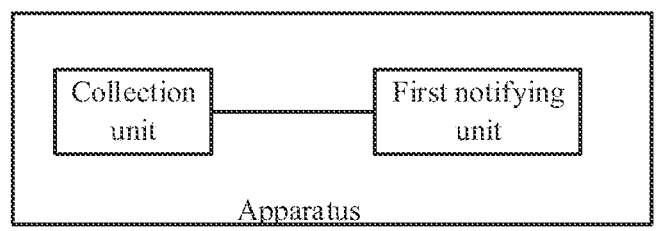
FIG. 11 is a structural diagram of a first apparatus according to an embodiment of the present disclosure.

FIG. 11 is a structural diagram of a first apparatus according to an embodiment of the present disclosure. The apparatus corresponds to the flow shown in FIG. 1. The apparatus is applied to a first ASBR in a first AS, and the first ASBR is connected with a second ASBR in a second AS; as shown in FIG. 11, the apparatus may include:

a collection unit, configured to collect BFR identifiers (IDs) of respective BFRs in the first AS; and a first notifying unit, configured to notify a route UPDATE message to the second ASBR in the second AS, where the UPDATE message carries NLRI and BIER Path Attribute; the NLRI at least includes a first BFR prefix of the first ASBR in a first SD; the BIER Path Attribute at least includes the collected BFR IDs; the UPDATE message is used for a BFR in the second AS to add a corresponding BIFT forwarding entry in a BIFT according to the NLRI and the BIER Path Attribute; and the BIFT forwarding entry at least includes: a BFR neighbor and a F-BM, the BFR neighbor is indicated by the first BFR prefix, the F-BM represents BFR IDs corresponding to respective BFRs reachable via the BFR neighbor, and the BFR IDs represented by the F-BM at least include the BFR IDs collected by the first ASBR in the first AS.

As an embodiment, collecting the BFR IDs of respective BFRs in the first AS includes:
  collecting a BFR ID of a BFR deployed as a Bit-Forwarding Ingress Router (BFIR) in the first AS; and
  collecting a BFR ID of a BFR deployed as a Bit-Forwarding Egress Router (BFER) in the first AS.

As an embodiment, the BIER Path Attribute carries a first TLV; the first TLV at least includes at least one field pair, and each field pair includes a BFR ID field and a BFR ID range field which are in corresponding relationship;
  the first TLV carries the BFR IDs collected by the first ASBR in the first AS through at least one field pair; where in each field pair, a parameter carried in the BFR ID Range field represents a BFR ID segment with continuous values, and the BFR ID field carries a start BFR ID of the BFR ID segment.

As an embodiment, the BIER Path Attribute further carries a second TLV;
  a type field in the second TLV is used to carry a BIER encapsulation type supported by the first ASBR; and
  the second TLV further includes a BIER encapsulation information field which is used to carry BIER encapsulation information supported by the first ASBR; and
  the BIER encapsulation information is used to determine an entry identifier of the BIFT forwarding entry.

As an embodiment, the BIER encapsulation information at least includes:
  MAX SI, which represents an SI corresponding to a maximum BFR ID in the first AS;
  BSL, which represents a bit string length in a supported BIER encapsulation; and
  BIFT ID, which represents an identifier of a local BIFT.

As an embodiment, the BIER Path Attribute further carries an SD configuration field; the SD configuration field carries SD configuration information;
  where the SD configuration information at least includes the first SD and the BFR ID of the first ASBR.

Thus, the descriptions of structure of the apparatus shown in FIG. 11 is completed.

Figure 12:
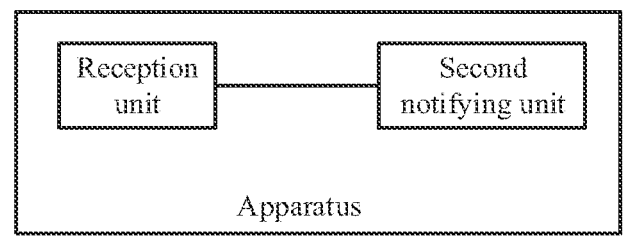
FIG. 12 is a structural diagram of a second apparatus according to an embodiment of the present disclosure.

FIG. 12 is a structural diagram of a second apparatus according to an embodiment of the present disclosure. The apparatus is applied to a network device in a second AS. When the network device is a second ASBR and the second ASBR is connected with a first ASBR in a first AS, the apparatus corresponds to the flow shown in FIG. 6 and may include:
  a reception unit, configured to receive a route UPDATE message notified by the first ASBR in the first AS, where the UPDATE message carries NLRI and a BIER Path Attribute, the NLRI at least includes a first BFR prefix of the first ASBR in a first SD; the BIER Path Attribute at least includes BFR IDs collected by the first ASBR in the first AS; and
  a second notifying unit, configured to notify the NLRI and the BIER Path Attribute in the second AS, so that any BFR receiving the NLRI and the BIER Path Attribute in the second AS adds a corresponding BIFT forwarding entry in a local BIFT.

As an embodiment, optionally, the apparatus may further include: a forwarding unit.

The forwarding unit is configured to, when receiving an original multicast packet, forward an IPV6 packet corresponding to the original multicast packet to a target BFR, where the IPv6 packet is obtained by encapsulating BIER information and IPV6 information in the original multicast packet, the BIER information at least includes a Bitstring, a bit in the Bitstring corresponding to a BFR ID of the target BFR is set as a first value for indicating forwarding, the BFR IDs represented by the F-BM include the BFR ID of the target BFR, an outer layer IPv6 destination address in the IPV6 information is the first BFR prefix.

Thus, the descriptions of structure of the apparatus shown in FIG. 12 is completed.

Figure 13:
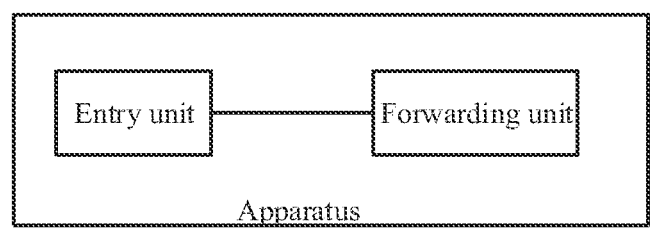
FIG. 13 is a structural diagram of a third apparatus according to an embodiment of the present disclosure.

FIG. 13 is a structural diagram of a third apparatus according to an embodiment of the present disclosure. The apparatus is applied to a network device in a second AS. When the network device is any BFR other than the second ASBR, the apparatus corresponds to the flow shown in FIG. 8, as shown in FIG. 13, the apparatus may include:
  an entry unit, configured to, when receiving the NLRI and the BIER Path Attribute notified by the second ASBR in the second AS, add a corresponding Bit Index Forwarding Table (BIFT) forwarding entry in a local BIFT; where the BIFT forwarding entry at least includes a BFR neighbor and a forwarding bit mask (F-BM), the BFR neighbor is indicated by the first BFR prefix, the F-BM represents BFR IDs corresponding to respective BFRs reachable via the BFR neighbor, and the respective BFRs reachable via the BFR neighbor include BFRs corresponding to the BFR IDs collected by the first ASBR in the first AS;
  a forwarding unit, configured to, when receiving an original multicast packet, forward an IPV6 packet corresponding to the original multicast packet to a target BFR, where the IPV6 packet is obtained by encapsulating BIER information and IPv6 information in the original multicast packet, the BIER information at least includes a Bitstring, a bit in the Bitstring corresponding to a BFR ID of the target BFR is set as a first value for indicating forwarding, the BFR IDs represented by the F-BM include the BFR ID of the target BFR, an outer layer IPv6 destination address in the IPV6 information is the first BFR prefix.

Thus, the descriptions of structure of the apparatus shown in FIG. 13 is completed.

Figure 14:
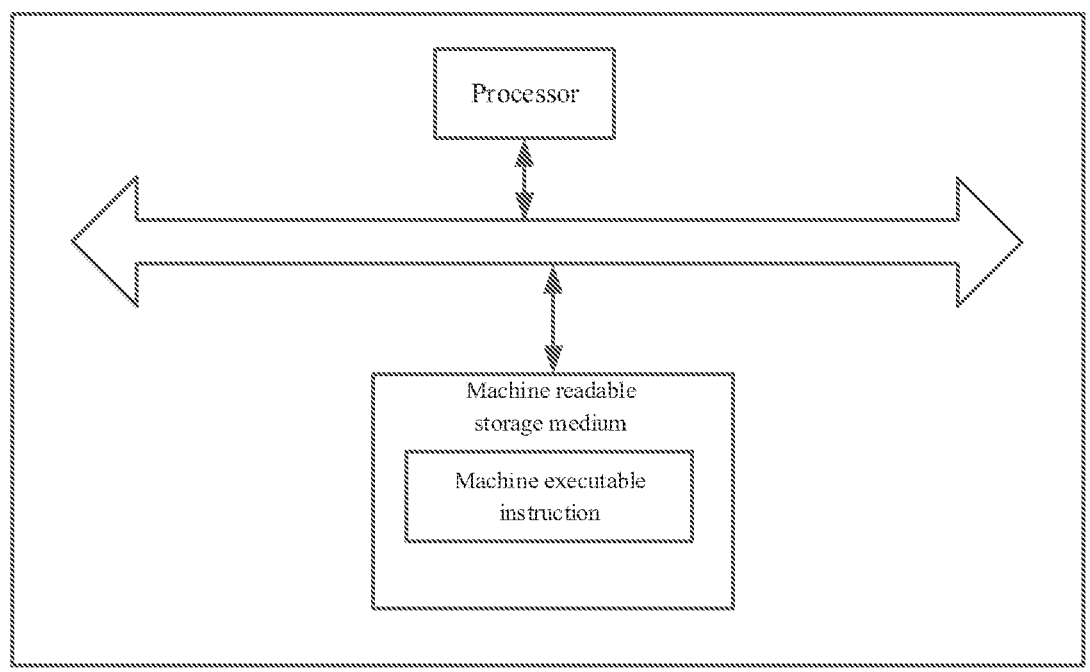
FIG. 14 is a hardware structural diagram of an apparatus according to an embodiment of the present disclosure.

An embodiment of the present disclosure further provides a hardware structure of the apparatus. FIG. 14 is a structural diagram of an electronic device according to an embodiment of the present disclosure. As shown in FIG. 14, the hardware structure may include: a processor and a machine readable storage medium. The machine readable storage medium stores machine executable instructions executable by the processor; and the processor is configured to execute the machine executable instructions to implement the method according to the above embodiments of the present disclosure.

Based on the same idea as the above method, an embodiment of the present disclosure further provides a machine readable storage medium storing several computer instructions, where the computer instructions are executed by a processor to implement the method according to the above embodiments of the present disclosure.

Illustratively, the machine readable storage medium mentioned herein may be any of electronic, magnetic, optical or other physical storage devices and may contain or store information such as executable instructions, data and so on. For example, the machine readable storage medium may be a Radom Access Memory (RAM), a volatile memory, a non-volatile memory, a flash memory, a storage drive (e.g. hard disk drive), a solid state harddisk, any type of storage disk (e.g., compact disk, Digital Video Disk (DVD)), or a similar storage medium, or a combination thereof.

The systems, apparatuses, modules or units described in the above embodiments may be specifically implemented by a computer chip or an entity or may be implemented by a product with a particular function. A typical implementing device may be a computer and the computer may be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

For ease of descriptions, the above apparatuses are divided into different units based on functionality for descriptions. Of course, the functions of different units may be implemented in a same or a plurality of hardware and/or software when practicing the present disclosure.

The persons skilled in the art should understand that the embodiments of the present disclosure may be provided as a method, a system, or a computer program product. Thus, entire hardware embodiments, entire software embodiments or embodiments combining software and hardware may be adopted in the present disclosure. Further, the present disclosure may be implemented in the form of a computer program product that is operated on one or more computer available storage media (including but not limited to magnetic disk memory, CD-ROM, and optical memory and so on) including computer available program codes.

The present disclosure is described by referring to flowcharts and/or block diagrams of a method, a device (a system) and a computer program product in an embodiment of the present disclosure. It is understood that each flowchart and/or block in the flowcharts and/or the block diagrams or a combination of a flow chart and/or a block of the flowcharts and/or the block diagrams may be implemented by computer program instructions. These computer program instructions may be provided to a general-purpose computer, a dedicated computer, an embedded processor, or a processor of another programmable data processing device to generate a machine so that the instructions executable by a computer or a processor of another programmable data processing device generate an apparatus for implementing functions designated in one or more flows of the flowcharts and/or one or more blocks of the block diagrams.

Further, these computer program instructions may also be stored in a computer readable memory that can direct a computer or another programmable data processing device to work in a particular manner so that the instructions stored in the computer readable memory generate a product including an instruction apparatus and the instruction apparatus can implement functions designated in one or more flows of the flowcharts and/or one or more blocks of the block diagrams.

The computer program instructions may also be loaded on a computer or another programmable data processing devices, so that a series of operation steps can be executed on the computer or another programmable device to generate processing achieved by the computer, and thus instructions executable on the computer or another programmable device are provided for steps for realizing functions designated in one or more flows of the flowcharts and/or one or more blocks of the block diagrams.

The foregoing descriptions are only embodiments of the present disclosure but not intended to limit the present disclosure. For the persons skilled in the art, various modifications and changes may be made to the present disclosure. Any modifications, equivalent substitutions, and improvements made within the spirit and principles of the disclosure shall be encompassed in the scope of protection of the present disclosure.

The foregoing disclosure is merely illustrative of preferred embodiments of the present disclosure but not intended to limit the present disclosure, and any modifications, equivalent substitutions, adaptations thereof made within the spirit and principles of one or more embodiments in the present disclosure shall be encompassed in the scope of protection of the present disclosure.

The invention claimed is:

1. A route notifying method, the method being performed by a first autonomous system border router (ASBR) in a first autonomous system (AS), wherein the first ASBR is connected with a second ASBR in a second AS; the method comprises:

collecting Bit-Forwarding Router (BFR) identifiers (IDs) of respective BFRs in the first AS, comprising:
collecting a BFR ID of a BFR deployed as a Bit-Forwarding Ingress Router (BFIR) in the first AS; and
collecting a BFR ID of a BFR deployed as a Bit-Forwarding Egress Router (BFER) in the first AS; and notifying a route UPDATE message to the second ASBR in the second AS, wherein the UPDATE message carries network layer reachability information (NLRI) and a Bit Index Explicit Replication (BIER) Path Attribute; the NLRI at least comprises a first BFR prefix of the first ASBR in a first Sub-Domain (SD); the BIER Path Attribute at least comprises the collected BFR IDs; the UPDATE message is used for a BFR in the second AS to add a corresponding Bit Index Forwarding Table (BIFT) forwarding entry in a BIFT according to the NLRI and the BIER Path Attribute; and the BIFT forwarding entry at least comprises: a BFR neighbor and a forwarding bit mask (F-BM), the BFR neighbor is indicated by the first BFR prefix, the F-BM represents BFR IDs corresponding to respective BFRs reachable via the BFR neighbor, and the BFR IDs represented by the F-BM at least comprise the BFR IDs collected by the first ASBR in the first AS.

2. The method of claim 1, wherein the BIER Path Attribute carries a first TLV; the first TLV at least comprises at least one field pair, and each field pair comprises a BFR ID field and a BFR ID range field which are in corresponding relationship;

the first TLV carries the BFR IDs collected by the first ASBR in the first AS through at least one field pair; wherein in each field pair, a parameter carried in the BFR ID Range field represents a BFR ID segment with continuous values, and the BFR ID field carries a start BFR ID of the BFR ID segment.

3. The method of claim 1, wherein the BIER Path Attribute further carries a second TLV;
  a type field in the second TLV is used to carry a BIER encapsulation type supported by the first ASBR; and
  the second TLV further comprises a BIER encapsulation information field which is used to carry BIER encapsulation information supported by the first ASBR; and the BIER encapsulation information is used to determine an entry identifier of the BIFT forwarding entry.

4. The method of claim 1, wherein the BIER Path Attribute further carries an SD configuration field;
  the SD configuration field carries SD configuration information;
wherein the SD configuration information at least comprises the first SD and the BFR ID of the first ASBR.

5. A route notifying method, the method being performed by a network device in a second autonomous system (AS) and comprising:
  when the network device is a second border router (ASBR) and the second ASBR is connected with a first ASBR in a first AS,
  receiving a route UPDATE message notified by the first ASBR in the first AS, wherein the UPDATE message carries network layer reachability information (NLRI) and a Bit Index Explicit Replication (BIER) Path Attribute, the NLRI at least comprises a first Bit-Forwarding Router (BFR) prefix of the first ASBR in a first Sub-Domain (SD); the BIER Path Attribute at least comprises BFR IDs collected by the first ASBR in the first AS; wherein the collected BFR IDs comprises: a collected BFR ID of a BFR deployed as a Bit-Forwarding Ingress Router (BFIR) in the first AS, and a collected BFR ID of a BFR deployed as a Bit-Forwarding Egress Router (BFER) in the first AS; and
  notifying the NLRI and the BIER Path Attribute in the second AS, so that any BFR receiving the NLRI and the BIER Path Attribute in the second AS adds a corresponding Bit Index Forwarding Table (BIFT) forwarding entry in a local BIFT.

6. The method of claim 5, wherein when the network device is any BFR other than the second ASBR, the method further comprises:
  when receiving the NLRI and the BIER Path Attribute notified by the second ASBR in the second AS, adding a corresponding Bit Index Forwarding Table (BIFT) forwarding entry in a local BIFT; wherein the BIFT forwarding entry at least comprises a BFR neighbor and a forwarding bit mask (F-BM), the BFR neighbor is indicated by the first BFR prefix, the F-BM represents BFR IDs corresponding to respective BFRs reachable via the BFR neighbor, and the respective BFRs reachable via the BFR neighbor comprise BFRs corresponding to the BFR IDs collected by the first ASBR in the first AS.

7. The method of claim 6, further comprising:
  when receiving an original multicast packet, forwarding an IPV6 packet corresponding to the original multicast packet to a target BFR, wherein the IPV6 packet is obtained by encapsulating BIER information and IPV6 information in the original multicast packet, the BIER information at least comprises a Bitstring, a bit in the Bitstring corresponding to a BFR ID of the target BFR is set as a first value for indicating forwarding, the BFR IDs represented by the F-BM comprise the BFR ID of the target BFR, an outer layer IPv6 destination address in the IPV6 information is the first BFR prefix.

8. The method of claim 5, wherein when the network device is the second ASBR, the method further comprises:
  when receiving an IPV6 packet corresponding to an original multicast packet, forwarding the IPV6 packet according to an outer layer IPV6 destination address in the IPV6 packet, wherein the IPV6 packet is obtained by encapsulating BIER information and IPV6 information in the original multicast packet.

9. An electronic device, comprising a processor and a machine readable storage medium;
  wherein the machine readable storage medium stores machine executable instructions executable by the processor;
  the processor is configured to execute the machine executable instructions to implement a route notifying method, the method being performed by a first autonomous system border router (ASBR) in a first autonomous system (AS), wherein the first ASBR is connected with a second ASBR in a second AS; the method comprises:
  collecting Bit-Forwarding Router (BFR) identifiers (IDs) of respective BFRs in the first AS, comprising:
    collecting a BFR ID of a BFR deployed as a Bit-Forwarding Ingress Router (BFIR) in the first AS; and
    collecting a BFR ID of a BFR deployed as a Bit-Forwarding Egress Router (BFER) in the first AS; and
  notifying a route UPDATE message to the second ASBR in the second AS, wherein the UPDATE message carries network layer reachability information (NLRI) and a Bit Index Explicit Replication (BIER) Path Attribute; the NLRI at least comprises a first BFR prefix of the first ASBR in a first Sub-Domain (SD); the BIER Path Attribute at least comprises the collected BFR IDs; the UPDATE message is used for a BFR in the second AS to add a corresponding Bit Index Forwarding Table (BIFT) forwarding entry in a BIFT according to the NLRI and the BIER Path Attribute; and the BIFT forwarding entry at least comprises: a BFR neighbor and a forwarding bit mask (F-BM), the BFR neighbor is indicated by the first BFR prefix, the F-BM represents BFR IDs corresponding to respective BFRs reachable via the BFR neighbor, and the BFR IDs represented by the F-BM at least comprise the BFR IDs collected by the first ASBR in the first AS.

10. The electronic device of claim 9, wherein the BIER Path Attribute carries a first TLV; the first TLV at least comprises at least one field pair, and each field pair comprises a BFR ID field and a BFR ID range field which are in corresponding relationship;
  the first TLV carries the BFR IDs collected by the first ASBR in the first AS through at least one field pair;
  wherein in each field pair, a parameter carried in the BFR ID Range field represents a BFR ID segment with continuous values, and the BFR ID field carries a start BFR ID of the BFR ID segment.

11. The electronic device of claim 9, wherein the BIER Path Attribute further carries a second TLV;
  a type field in the second TL V is used to carry a BIER encapsulation type supported by the first ASBR; and
  the second TLV further comprises a BIER encapsulation information field which is used to carry BIER encapsulation information supported by the first ASBR; and the BIER encapsulation information is used to determine an entry identifier of the BIFT forwarding entry.

12. The electronic device of claim 9, wherein the BIER Path Attribute further carries an SD configuration field;
the SD configuration field carries SD configuration information;
wherein the SD configuration information at least comprises the first SD and the BFR ID of the first ASBR.

13. An electronic device, comprising a processor and a machine readable storage medium;
wherein the machine readable storage medium stores machine executable instructions executable by the processor;
the processor is configured to execute the machine executable instructions to implement the method as claimed in claim 6.

14. The electronic device of claim 13, wherein when the network device is any BFR other than the second ASBR, the processor is further configured to execute the machine executable instructions to:
when receiving the NLRI and the BIER Path Attribute notified by the second ASBR in the second AS, add a corresponding Bit Index Forwarding Table (BIFT) forwarding entry in a local BIFT; wherein the BIFT forwarding entry at least comprises a BFR neighbor and a forwarding bit mask (F-BM), the BFR neighbor is indicated by the first BFR prefix, the F-BM represents BFR IDs corresponding to respective BFRs reachable via the BFR neighbor, and the respective BFRs reachable via the BFR neighbor comprise BFRs corresponding to the BFR IDs collected by the first ASBR in the first AS.

15. The electronic device of claim 14, wherein the processor is further configured to execute the machine executable instructions to:
when receiving an original multicast packet, forward an IPV6 packet corresponding to the original multicast packet to a target BFR, wherein the IPV6 packet is obtained by encapsulating BIER information and IPV6 information in the original multicast packet, the BIER information at least comprises a Bitstring, a bit in the Bitstring corresponding to a BFR ID of the target BFR is set as a first value for indicating forwarding, the BFR IDs represented by the F-BM comprise the BFR ID of the target BFR, an outer layer IPV6 destination address in the IPV6 information is the first BFR prefix.

16. The electronic device of claim 9, wherein when the network device is the second ASBR, the processor is further configured to execute the machine executable instructions to:
when receiving an IPv6 packet corresponding to an original multicast packet, forward the IPV6 packet according to an outer layer IPV6 destination address in the IPV6 packet, wherein the IPV6 packet is obtained by encapsulating BIER information and IPV6 information in the original multicast packet.

17. A non-transitory machine readable storage medium storing several computer instructions, where the computer instructions are executed by a processor to implement the method according to claim 1.

18. A non-transitory machine readable storage medium storing several computer instructions, where the computer instructions are executed by a processor to implement the method according to claim 5.

* * * * *